United States Patent [19]
Gallucci et al.

[11] Patent Number: 5,166,246
[45] Date of Patent: Nov. 24, 1992

[54] POLYETHERIMIDE-POLYAMIDE COMPOSITIONS

[75] Inventors: Robert R. Gallucci, Pittsfield; John A. Rock, Becket, both of Mass.

[73] Assignee: General Electric Company, Pittsfield, Mass.

[21] Appl. No.: 342,920

[22] Filed: Apr. 5, 1989

Related U.S. Application Data

[63] Continuation of Ser. No. 816,471, Jan. 6, 1986, abandoned.

[51] Int. Cl.$^5$ .......................... C08K 5/13; C08L 77/00
[52] U.S. Cl. ...................................... 524/341; 524/342; 524/343; 524/344; 524/345; 524/346; 524/347; 524/349; 524/351; 524/352; 525/432; 525/436
[58] Field of Search ............... 524/346, 341, 342, 343, 524/344, 345, 347, 349, 351, 352; 525/432

[56] References Cited

U.S. PATENT DOCUMENTS

| | | | |
|---|---|---|---|
| 2,906,732 | 9/1959 | Kessler | 524/346 |
| 2,965,599 | 12/1960 | Gabler | 524/346 |
| 3,355,409 | 11/1987 | Bissot | 524/346 |
| 4,612,353 | 9/1986 | Andrews et al. | 525/432 |
| 4,657,987 | 4/1987 | Rock et al. | 525/432 |
| 4,849,474 | 7/1989 | Gallucci | 525/92 |

FOREIGN PATENT DOCUMENTS 1063767 4/1986 Japan .................... 524/346

*Primary Examiner*—Ana L. Carrillo
*Attorney, Agent, or Firm*—Edward A. Hedman, Gibson & Costigan

[57] ABSTRACT

Polyphenylene ether- polyamide compositions having improved resistance to water absorption and swell are provided by incorporating therein a phenolic compound.

6 Claims, No Drawings

POLYETHERIMIDE-POLYAMIDE COMPOSITIONS

This is a continuation of application Ser. No. 06/816,471 filed on Jan. 6, 1986 abandoned.

The present invention relates to polyetherimide-polyamide compositions having improved resistance to moisture as manifested by reduced water absorption and swell in moist environments. More specifically, polyetherimide-polyamide compositions are rendered less susceptable to weight gain and expansion in moist environments by incorporating therein certain phenolic compounds and polymers.

BACKGROUND OF THE INVENTION

Polyamides are well known and have enjoyed tremendous commercial success, particularly in the fiber and bristle industries, as a result of their generally excellent processability and solvent resistance. However, their utility as molding compositions has been hindered as a result of their poor tolerence to moist environments, particularly with respect to their tendency to absorb water, thus gain weight, and to swell or expand.

Polyetherimides, on the other hand, are a more recent class of high performance specialty thermoplastics. Because of their high continuous-use temperatures, inherent flame resistance, low smoke evolution, good electrical properties and generally good physical properties, they are becoming more and more desirable for a wide range of applications requiring such characteristisc, particularly in the high tech electronics industries and in the manufacture of aircraft and the like. However, because of their high temperature characteristics, very high temperatures are needed to process the thermoplastic, e.g. from about 680° to 820° F. Such high temperatures may have a tendency to adversely affect the properties of the polymer. Furthermore, while the polyetherimides have numerous beneficial characterisitics, they are susceptible to premature failure in certain environments.

Recently, Robeson et al (European Patent Appl. 104659) found that by blending polyetherimides with polyamides, one could obtain a composition having improved processability at lower temperatures and better chemical resistance without adversely affecting the excellent mechanical properties of the polyetherimide.

However, the benefits of such blends are not without their detrimental aspects. In particular, while the polyamide brings may benefical characteristics to the blend, it also brings the undesired characteristic of poor tolerence to water, specifically with respect to absorption and expansion. Because of this characteristic, certain applications for the high property profile polyetherimide resins, particularly the high tech electronic applications where part size tolerence is critical, are no longer feasible.

It is therefore an object of the present invention to provide polyetherimide-polyamide compositions having improved tolerence to water or moisture with little, if any, adverse impact on the excellent properties of such blends.

SUMMARY OF THE INVENTION

It has now been found that polyetherimide-polyamide blends may be prepared having reduced water absorption characteristics and improved dimensional stability with little, if any, adverse impact on the physical properties of the blend by incorporating therein one or more phenolic compounds capable of manifesting said improvements.

Specifically, polyetherimide-polyamide blend compositions are rendered less susceptible to water absorption and expansion due to moisture by incorporating therein at least one phenolic compound, oligomer or polymer selected from the group consisting of a) mono-, di- and polyphenols of the formula:

and bisphenols and higher phenols of the formula:

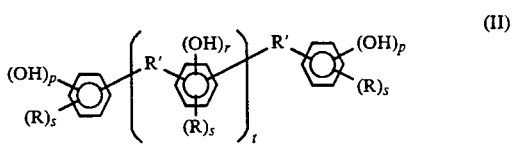

wherein n equals 1, 2 or 3, m equals 3, 4 or 5, and (n+m)=6; p equals 1 or 2, each r is independently equal to 0, 1 or 2, and each s is independently equal to 0, 1, 2, 3 or 4 as appropriate; t equals 0, 1, 2, 3 or 4; each R is independently hydrogen; halogen, e.g. bromine, chlorine, fluorine, etc.; a $C_1$–$C_{16}$ alkyl, a $C_6$–$C_{18}$ aryl or a $C_7$–$C_{20}$ arylalkyl radical, any of which may be substituted with a $C_1$–$C_{12}$alkyl group or with a halogen atom and whereby the aryl radical, if present, may be bonded by a —O—, $C_1$–$C_3$ alkylene or alkylidene, or —$SO_2$— bridge member; or a hydroxy aryl or alkyl hydroxy aryl radical; and each R' is independently selected from the group consisting of a direct carbon-carbon bond or a bridge member selected from the group consisting of divalent alkyl, aryl, arylalkyl, hydroxy aryl or alkyl hydroxy aryl radicals, including halogen substituted derivatives of each; divalent ester and amide radicals; and hetero containing bridges including:

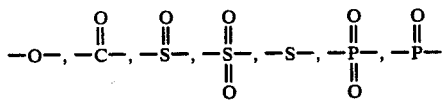

and the like; provided that there are no phenolic hydroxy groups having two adjacent alkyl radicals on the phenol ring with tertiary alpha carbon atoms; and (b) oligomeric and polymeric phenols characterized as having free (i.e. unreacted) phenolic hydroxy groups along the oligomer or polymer chain or in pendant phenol radicals attached to the oligomer or polymer chain; provided that there are no phenolic hydroxy groups having two adjacent alkyl radicals on the phenol ring with tertiary alpha carbon atoms.

DETAILED DESCRIPTION

The polyetherimide component of the blends of this invention contain repeating groups of the formula:

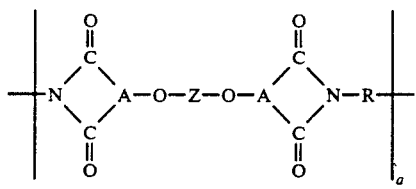

where "a" represents a whole number in excess of 1, e.g., 10 to 10,000 or more, the group —O—A< is selected from:

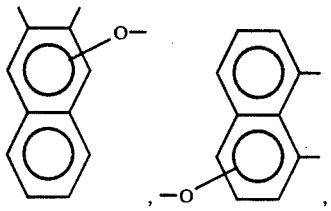

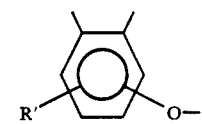

R' being hydrogen, lower alkyl or lower alkoxy. Preferably, the polyetherimide includes the latter —O—A< group where R' is hydrogen, such that the polyetherimide is of the formula:

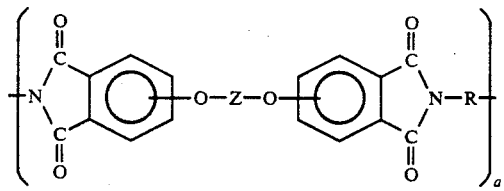

and the divalent bonds of the —O—Z—O— radical are in the 3,3'; 3,4'; 4,3' or the 4,4' position; Z is a member of the class consisting of (1)

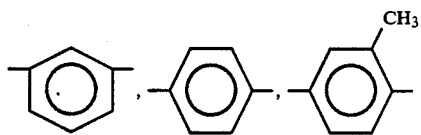

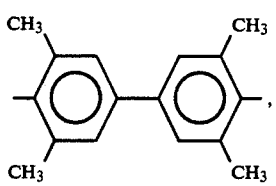

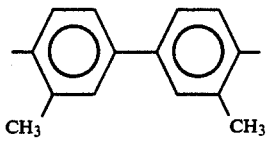

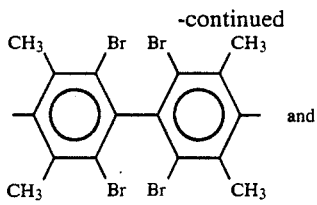

and

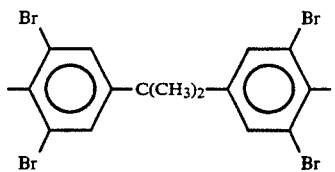

and (2) divalent organic radicals of the general formula:

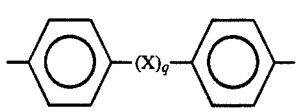

where X is a member selected from the class consisting of divalent radicals of the formulas, $$-C_yH_{2y}-, -\overset{O}{\underset{\|}{C}}-, -\overset{O}{\underset{\underset{\|}{O}}{\overset{\|}{S}}}-, -O- \text{ and } -S-$$

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_2$ to $C_8$ alkylene terminated polydiorganosiloxane, and (3) divalent radicals included by the formula

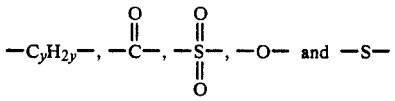

where Q is a member selected from the class consisting of $$-O-, -\overset{O}{\underset{\|}{C}}-, -\overset{O}{\underset{\underset{\|}{O}}{\overset{\|}{S}}}-, -S- \text{ and } -C_xH_{2x}-$$

where x is a whole number from 1 to 5 inclusive. Particularly preferred polyetherimides for the purposes of the present invention include those where —O—A< and Z respectively are:

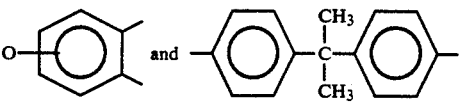

and R is selected from:

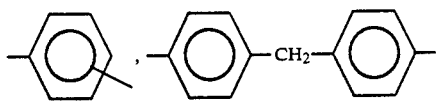

and

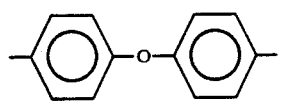

The polyetherimides where R is m-phenylene are most preferred.

It is also contemplated that the polyetherimide may be a copolymer which, in addition to the etherimide units described above, further contains repeating units of the formula

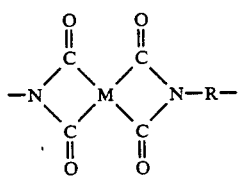

wherein R is as previously defined and M is selected from the group consisting of

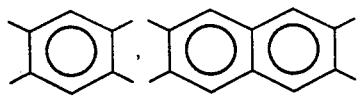

and

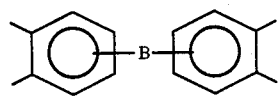

where B is —S— or

These polyetherimide copolymers are described by Williams et al. in U.S. Pat. No. 3,983,093, incorporated herein by reference.

The polyetherimides can be obtained by any of the methods well known to those skilled in the art including the reaction of an aromatic bis(ether anhydride) of the formula:

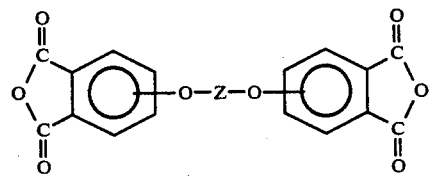

where Z is as defined herein before with an organic diamine of the formula

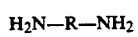

where R is as defined herein before.

Aromatic bis(ether anhydride)s of the above formula include, for example, 2-bis[4-(2,3-dicarboxyphenoxy)-phenyl]propane dianydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxy)diphenyl ether dianhydride; 4,4'-bis(3,4-dicarboxy)diphenyl sulfide dianhydride; 1,3-bis(3,4-dicarboxyphenoxy)benzene dianhydride; 1,4-bis(3,4-dicarboxyphenoxy)benzene dianhydride; 4,4-bis(3,4-dicarboxyphenoxy)benzophenone dianhydride; 4-(2,3-dicarboxyphenoxy)-4'-(3,4-dicarboxyphenoxy) diphenyl-2,2-propane dianhydride; etc. and mixtures of such dianhydrides.

In addition, aromatic bis(ether anhydride)s included in the above formulas are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh. Org. Khin., 4(5) 774 (1968).

Organic diamines of the above formulas include, for example, m-phenylenediamine, p-phenylenediamine, 4,4'-diaminodiphenylpropane, 4,4'diaminodiphenylmethane, benzidine, 4,4'-diaminodiphenyl sulfide, 4,4'-diaminodiphenyl sulfone, 4,4'-diaminodiphenyl ether, 1,5 diaminonaphthalene, 3,3'-dimethylbenzidine, 3,3'-dimethoxybenzidine, 2,4-bis(B-amino-t-butyl)toluene, bis(p-B-amino-t-butylphenyl)ether, bis(p-B-methyl-o-aminopentyl)benzene, 1,3-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylene diamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, etc. and mixtures of such diamines.

In general, the reactions can be carried out by employing well-known solvents, e.g., o-dichlorobenzene, m-cresol/toluene, etc. to effect interaction between the dianhydrides and the diamines, and temperatures of from about 100° C. to about 250° C. Alternatively, the polyetherimides can be prepared by melt polymerization of any of the above dianhydrides with any of the above organic diamines while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

Included in the many methods of making the polyetherimides are those disclosed in U.S. patent to Heath et al., U.S. Pat. No. 3,847,867, Williams U.S. Pat. No. 3,847,869, Takekoshi et al., U.S. Pat. No. 3,850,885, White U.S. Pat. Nos. 3,852,242 and 3,855,178, etc. These disclosures are incorporated herein in their entirety by reference for the purpose of teaching, by way of illustration, general and specific methods for preparing polyetherimides suitable for the blends of this invention.

Polyamides suitable for use in the practice of the present invention are well known and widely available. Basically they may be obtained by polymerizing a monoamino-monocarboxylic acid or a lactam thereof having at least 2 carbon atoms between the amino and carboxylic acid group; or by polymerizing substantially equimolecular proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, caprolactam, capryllactam, enantholactam, undecanolactam, dodecanolactam and 3- and 4- aminobenzoic acids.

Diamines suitable for use in the preparation of the polyamides include alkyl, aryl and alkyl-aryl diamines. Such diamines include, for example, those represented by the general formula:

H$_2$N(CH$_2$)$_n$NH$_2$ wherein n is an integer of from 2 to 16, such as trimethylenediamine, tetramethylenediamine, pentamethylenediamine, octamethylenediamine and especially hexamethylenediamine; trimethyl hexamethylene diamine; meta-phenylene diamin; meta-xylylene diamine and the like, as well as those mentioned above.

The dicarboxylic acids may be aromatic, for example isophthalic and terephthalic acids or aliphatic wherein the aliphatic dicarboxylic acids are of the formula

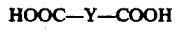

HOOC—Y—COOH wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example

| polypyrrolidone | (nylon 4) |
| polycaprolactam | (nylon 6) |
| polycapryllactam | (nylon 8) |
| polyhexamethylene adipamide | (nylon 6,6) |
| polyundecanolactam | (nylon 11) |
| polydodecanolactam | (nylon 12) |
| polyhexamethylene azelaiamide | (nylon 6,9) |
| polyhexamethylene sebacamide | (nylon 6,10) |
| polyhexamethylene isophthalimide | (nylon 6,I) |
| polyhexamethylene terephthalamide | (nylon 6,T) |
| polyamide of hexamethylene diamine and n-dodecanedioic acid | (nylon 6,12) | as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane.

Copolymers of the foregoing polyamides or prepolymers thereof are also suitable for use in the practice of the present invention. Such copolyamides include copolymers of the following:

| hexamethylene adipamide/caprolactam | (nylon 6,6/6) |
| hexamethylene adipamide/hexamethylene-isophthalamide | (nylon 6,6/6,I) |
| hexamethylene adipamide/hexamethylene-terephthalamide | (nylon 6,6/6,T) |
| hexamethylene adipamide/hexamethylene-azelaiamide | (nylon 6,6/6,9) |
| hexamethylene adipamide/hexamethylene-azelaiamide/caprolactam | (nylon 6,6/6,9/6) |

Mixtures and/or copolymers of two or more of the foregoing polyamides or prepolymers thereof, respectively, are also within the scope of the present invention.

Especially preferred polyamides are the polyamides 6,6; 11; 12 and mixture of at least one crystalline polyamide, e.g. 6; 6,6, and at least one amorphous polyamide, e.g. 6,I; 6,I,T; most preferrably polyamide 6,6.

It is also to be understood that the use of the term "polyamides" herein and in the appended claims is intended to include the toughened or super tough polyamides. Super tough polyamides, or super tough nylons, as they are more commonly known, are available commercially, e.g. from E. I. duPont (Zytel ® ST resins), Wilson Fiberfill (NY resins), Badische (ULTRAMID ® resins), Allied (CARPION ® resins) and Celanese (7000 series resins), among others, or may be prepared in accordance with a number of U.S. patents including, among others, Epstein—U.S. Pat. No. 4,174,358; Novak—U.S. Pat. No. 4,474,927; Roura—U.S. Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. patents as well as in Caywood, Jr.—U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425-437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The blending ratio of polyetherimide to polyamide will generally be from about 5 to 95% by wt., preferably from about 30 to 70% by wt., of the former to from about 95 to 5% by wt., preferably from about 70 to 30% by wt., of the latter. When the polyamide is less that 5 wt. percent, its effect to improve solvent resistance is small, while when it exceeds 95 wt. percent, thermal properties such as heat distortion temperature and dimensional stability tend to become poor.

The benefits of the present invention are realized by incorporating in the polyetherimide-polyamide blend an effective amount of a phenolic compound or phenol polymer or oligomer capable of reducing the undesired and detrimental characteristic of water absorption in the blend. Suitable phenolic compounds, oligomers and mono-, di- and polyphenols of the formula:

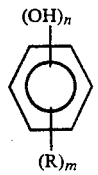 (I)

and bisphenols and higher phenols of the formula:

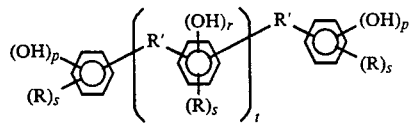 (II)

wherein n equals 1, 2 or 3, m equals 3, 4 or 5, and (n+m)=6; p equals 1 or 2, each r is independently equal to 0, 1 or 2, and each s is independently equal to 0, 1, 2, 3 or 4 as appropriate; t equals 0, 1, 2, 3 or 4; each R is independently hydrogen; halogen, e.g. bromine, chlorine, fluorine, etc.; a $C_1$-$C_{16}$ alkyl, a $C_6$-$C_{18}$ aryl or a $C_7$-$C_{20}$ arylalkyl radical, any of which may be substituted with a $C_1$-$C_{12}$alkyl group or with a halogen atom and whereby the aryl radical, if present, may be bonded by a —O—, $C_1$-$C_3$ alkylene or alkylidene, or —$SO_2$— bridge member; or a hydroxy aryl or alkyl hydroxy aryl radical; and each R' is independently selected from the group consisting of a direct carbon-carbon bond or a bridge member selected from the group consisting of divalent alkyl, aryl, arylalkyl, hydroxy aryl or alkyl hydroxy aryl radicals, including halogen substituted derivatives of each; divalent ester and amide radicals; and hetero containing bridges including:

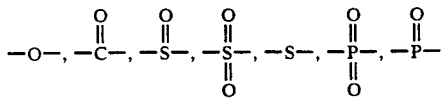

and the like; and (b) oligomeric and polymeric phenols characterized as having free (i.e. unreacted) phenolic hydroxy groups along the oligomer or polymer chain or in pendant phenol radicals attached to the oligomer or polymer chain; provided that there are no phenolic hydroxy groups having two adjacent alkyl radicals on the phenol ring with tertiary alpha carbon atoms.

Exemplary of suitable mono-, di- and polyphenols according to formula I above, there may be given decanaphthol, 2-butyl phenol(sec and tert), 4-t-butyl phenol, thymol, 4-t-pentyl phenol, octylphenols, nonyl phenols, dodecyl phenols, 4-hydroxy diphenyl, 2-hydroxy diphenyl, alkyl substituted hydroxy diphenyls (as disclosed in German application 1943230), benzyl cresols, 2-phenyl-2-(4-hydroxy phenyl) propane, 4-hydroxydiphenyl sulfone, 4-hydroxydiphenyl ether, 2- and 4-cyclohexylphenol, resorcinol, hydroquinone, 1,2,4-benzenetriol, phloroglucinol and mixtures thereof. Especially preferred are the nonyl phenols, dodecyl phenol, 2-hydroxy biphenyl, and 2-phenyl-2-(4-hydroxy phenyl)propane.

Exemplary of suitable bisphenols and polyphenols according to formula II there may be given 2,2-bis(4-hydroxyphenyl) propane; bis(4-hydroxy-phenyl)methane; 2,2-bis(4-hydroxyphenyl)heptane; 2,2-bis(3-chloro-4 hydroxyphenyl)propane; 2,2-bis(3,5-dichloro-4-hydroxyphenyl)propane; 2,2-bis(3,5-dibromo-4-hydroxyphenyl)propane; 2,2-bis(3-methyl-4-hydroxyphenyl)propane; 4,4'-(p-phenylenediisopropylidene)-bis(2,6-xylenol); 4,4'-(p-phenylenediisopropylidene)bisphenol; methylene bisphenol; biphenol; naphthalenediol; 4,4'-cyclohexylidene bisphenol; alpha, alpha', alpha"-tris (4-hydroxyphenyl)-1,2,5-triisopropylbenzene; 2,2-bis(3,5-dimethyl-4-hydroxyphenyl)sulfone; 2,2-bis(4-hydroxyphenyl)sulfone; 2,2-bis(2,4-dihydroxyphenyl)sulfone; and the like. Especially preferred is 2,2-bis(4-hydroxyphenyl)propane.

Exemplary of suitable oligomeric and polymeric phenols there may be given the polyvinyl phenols and the phenol-formaldehyde resins(e.g. novolak and resol resins). Generally such polymeric phenols will have a number average molecular weight of up to 40,000, preferably from about 400 to 30,000.

The amount by which the phenol compound or polymer will be employed in the practice of the present invention is that amount capable of providing dimensional stability and reducing water absorption in the polyetherimide-polyamide composition, preferably at least 10% improvement as compared to similar compositions prepared without the phenol. Generally, the amount of the phenol will be from about 0.5 to about 30, preferably from about 1 to about 20, most preferably from about 1.5 to about 10 parts by weight per 100 parts by weight of the mixture of polyetherimide and polyamide. The specific amount of phenol compound or polymer employed will depend in part upon the efficacy of the phenol itself, the weight ratio of polyamide to polyetherimide in the resin mixture and the extractability of the phenol upon conditioning and/or processing of the material.

The present invention is also applicable to polyetherimide-polyamide blends further comprising an additional thermoplastic polymer and/or a polymeric or copolymeric impact modifier resin.

Suitable thermoplastic polymers that may be included in the blends contemplated by the present invention include polyimides, polyamideimides, polycarbonates, polyaklylene ethers, polyphenylene ethers, polyarylates, polyesteramides, polyesters and the like. All of these thermoplastic polymers are well known and widely available.

Suitable rubbery impact modifiers are also well known and widely available. Exemplary of the many rubbery impact modifiers included within the scope of the present invention there may be given polyolefins and copolyolefins, e.g. polyethylenes, polypropylene, ethylene-propylene copolymer, copolymers of ethylene with acrylic acids and alkylacrylic acids, etc.; ethylene-propylene-diene monomer rubbers (EPDM); diene rubbers and copolymers, e.g. polybutadiene, polyisoprene, styrene-butadiene copolymer, styrene-butadiene-styrene block copolymers, and the like; nitrile rubbers and copolymers, e.g. styrene-acrylonitrile, acrylonitrile-butadiene-styrene type copolymers, etc. Such suitable rubbery impact modifiers are described in U.S. Pat. Nos. 2,933,480; 2,962,451; 3,000,866; 3,093,620; 3,093,621; 3,063,973; 3,147,230; 3,154,528; 3,260,708 among others, and in Sittig, "Stereo Rubber and Other Elastonic Process", Noyes Development Corporation, Park Ridge, N.J. (1967), altogether herein incorporated by reference.

Optionally, the compositions of the present invention may also contain one or more fillers and/or reinforcing agents. Exemplary of such fillers and/or reinforcing agents there may be given glass fibers, carbon fibers, glass spheres, mineral fillers, including mica and silica, carbon black, and the like. Where such fillers and/or reinforcing agents are employed they should constitute no more than up to about 50% by weight, preferably from about 5 to about 30% by weight of the composition based on the total composition.

Finally, the composition of the present invention may also contain such other ingredients as flame retardants, colorants, nucleating agents, drip inhibitors, stabilizers and the like in effective amounts known in the art for their conventionally employed purposes.

The composition of the present invention may be prepared by any of the known methods for melt blending. For example, the ingredients may be dry blended and extruded or fluxed on a mill and comminuted or they may be prepared by extrusion compounding. Suitable equipment for such processes include extruders, Banbury mixers, rollers, kneaders and the like. Additionally, these compositions may be prepared by continuous or batch processing.

The following examples are provided in order for those skilled in the art to better understand how to practice the present invention. These examples are for illustration only and are not intended to limit the invention thereto. Unless otherwise stated, all formulations are expressed in terms of parts by weight.

All blends were prepared by extrusion on either a single screw or twin screw extruder at 250°-300° C. All ingredients were mixed and fed together. Blend compositions were injection molded after drying for preparation of test parts. Moisture absorption and expansion were measured on samples immersed in de-ionized water for approximately 40 hrs at 75° C. Samples were cooled to room temperature for testing.

EXAMPLES 1-6, COMPARATIVE EXAMPLES A-B

A series of polyetherimide-polyamide blend compositions were prepared demonstrating the ability of various phenolic compounds within the scope of the present invention to reduce water absorption and expansion in parts molded from said compositions. The formulations of the specific examples and the results achieved with each were as shown in Table 1.

While some variation in the efficacy of certain of the phenolic compounds at the particular level tested is noted, particularly with respect to the p-cumyl phenol, all compounds clearly and significantly reduced water gain and expansion. It is believed that higher amounts of the p-cumyl phenol would likely manifest even greater improvement.

TABLE 1

|  | A | 1 | B | 2 | 3 | 4 | 5 | 6 |
|---|---|---|---|---|---|---|---|---|
| polyetherimide[a] | 50 | 50 | 50 | 50 | 50 | 50 | 50 | 50 |
| polyamide 6 | 50 | 50 | — | — | — | — | — | — |
| polyamide 6,6 | — | — | 50 | 50 | 50 | 50 | 50 | 50 |
| nonyl phenol | — | 3 | — | 3 | — | — | — | — |
| p-cumyl phenol | — | — | — | — | 3 | — | — | — |
| resorcinol | — | — | — | — | — | 3 | — | — |
| tetrachloro bisphenol A | — | — | — | — | — | — | 3 | — |
| tetrabromo bisphenol A | — | — | — | — | — | — | — | — |
| % weight gain* | 5.3 | 4.3 (19) | 4.2 | 3.4 (19) | 4.0 (5) | 3.14 (25) | 3.36 (20) | 3.48 (17) |
| expansion* mils/in. | 11.9 | 10.0 (16) | 9.0 | 7.4 (18) | 8.4 (7) | 6.8 (24) | 7.1 (21) | 7.2 (20) |

[a]Ultem 1000 ® resin from General Electric Company
*40 hour immersion in water at 75° C. The number in parenthesis indicates the percent improvement over the control.

EXAMPLES 7-9, COMPARATIVE EXAMPLE C

A second series of polyetherimide-polyamide blends were prepared to demonstrate the effectiveness of 2,2-bis(4-hydroxyphenyl)propane (i.e. bisphenol A) at different loadings. The specific compositions and the results achieved with each were as shown in Table 2.

TABLE 2

|  | C | 7 | 8 | 9 |
|---|---|---|---|---|
| polyamide 6,6 | 50 | 50 | 50 | 50 |
| polyetherimide[a] | 50 | 50 | 50 | 50 |
| bisphenol A | — | 2 | 5 | 11 |
| % weight gain* | 4.2 | 3.7 (12) | 3.3 (21) | 2.4 (43) |
| expansion* mils/in | 9.0 | 8.3 (8) | 7.2 (20) | 3.9 (57) |

[a] and * - see footnotes Table 1

EXAMPLES 10-12, COMPARATIVE EXAMPLES D-E

A final series of compositions were prepared demonstrating the applicability of the present invention to various blends of polyetherimide and polyamide. The specific formulations of each composition and the results obtained thereby were as shown in Table 3.

Obviously, other modifications and variations of the present invention are possible in light of the above teachings. It is therefore to be understood that changes may be made in the particular embodiments of the invention described which are within the full intended scope of the invention as defined by the appended claims.

TABLE 3

|  | D | 10 | E | 11 | F | 12 |
|---|---|---|---|---|---|---|
| polyetherimide[a] | 35 | 35 | 50 | 50 | 65 | 65 |
| polyamide 6 | 65 | 65 | 50 | 50 | 35 | 35 |
| bisphenol A | — | 3 | — | 3 | — | 3 |
| % weight gain* | 6.35 | 6.0 (6) | 5.26 | 4.63 (12) | 3.81 | 3.21 (16) |
| expansion* (mils/in) | 16.6 | 14.0 (16) | 11.9 | 10.3 (13) | 7.6 | 6.0 (21) |

[a] and * - see footnotes Table 2

We claim:

1. An improved polyetherimide-polyamide composition having reduced water absorption and improved resistance to swell upon exposure to moisture comprising:
   a) a polyetherimide resin,
   b) a polyamide resin, and
   c) a phenolic additive capable of providing the above-mentioned improvements and selected from the polyhydric phenols represented by the formulae:

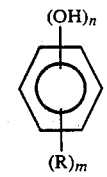

(I)

and

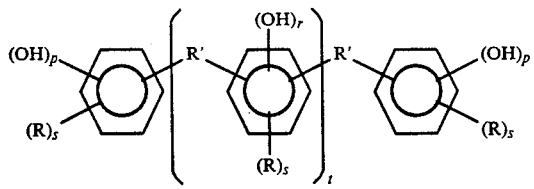

(II)

wherein n is selected from the group of whole numbers consisting of 2 and 3, m is selected from the group of whole numbers consisting of 3 and 4, and $(n+m)=6$; p is selected from the group of whole numbers consisting of 1 and 2, each r is independently selected from the group of whole numbers consisting of 0, 1 and 2, and each s is independently selected from the group of whole numbers consisting of 3 and 4 as appropriate; t is selected from the group of whole numbers consisting of 0, 1, 2, 3 and 4; each R is independently selected from the group consisting of hydrogen, halogen, a $C_1$-$C_{16}$ alkyl, a $C_6$-$C_{18}$ aryl, a $C_7$-$C_{20}$ arylalkyl radical, a hydroxy aryl and alkyl hydroxy aryl radical; and each R' is independently selected from the group consisting of divalent alkyl, aryl, arylalkyl, hydroxy aryl and alkyl hydroxy aryl radicals; provided that there are no phenolic hydroxy groups having two adjacent alkyl radicals on the phenol ring with tertiary alpha carbon atoms.

2. An improved polyetherimide-polyamide composition having reduced water absorption and improved resistance to swell upon exposure to moisture comprising:
   a) a polyetherimide resin,
   b) a polyamide resin, and
   c) an effective water absorption reducing amount of a phenolic additive capable of providing the above-mentioned improvements and selected from the polyhydric phenols represented by the formulae:

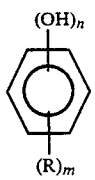

(I)

and

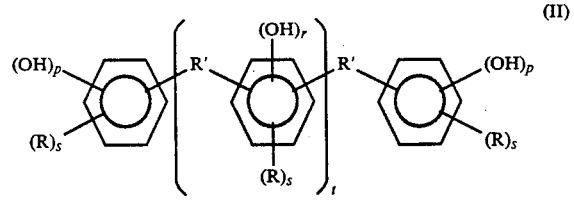

(II)

wherein n is selected from the group of whole numbers consisting of 2 and 3, m is selected from the group of whole numbers consisting of 3 and 4, and $(n+m)=6$; p is selected from the group of whole numbers consisting of 1 and 2, each r is independently selected from the group of whole numbers consisting of 0, 1 and 2, and each s is independently selected from the group of whole numbers consisting of 3 and 4 as appropriate; t is selected from the group of whole numbers consisting of 0, 1, 2, 3 and 4; each R is independently selected from the group consisting of hydrogen, halogen, a $C_1$-$C_{16}$ alkyl, a $C_6$-$C_{18}$ aryl, a $C_7$-$C_{20}$ arylalkyl radical, a hydroxy aryl and alkyl hydroxy aryl radical; and each R' is independently selected from the group consisting of divalent alkyl, aryl, arylalkyl, hydroxy aryl and alkyl hydroxy aryl radicals; provided that there are no phenolic hydroxy groups having two adjacent alkyl radicals on the phenol ring with tertiary alpha carbon atoms.

3. A composition comprising:

a) a polyetherimide resin,
b) a polyamide resin, and
c) a phenolic additive selected from the group consisting of 2,2 bis(4-hydroxyphenyl)propane and resorcinol, the ratio of polyetherimide resin to polyamide resin being from 5 to 95% by weight of polyetherimide resin to from about 95 to 5% by weight polyamide resin, said phenolic additive being present in said composition in an amount of from 0.5 to 30 parts by weight per 100 parts by weight of the mixture of polyetherimide and polyamide.

4. A composition comprising:
a) at least one polyetherimide,
b) at least one polyamide, and
c) at least one phenolic additive selected from the group consisting of resorcinol and hydroquinone, the ratio of polyetherimide to polyamide being from 5 to 95% by weight of polyetherimide to from about 95 to 5% by weight polyamide, said phenolic additive being present in said composition in an amount of from 0.5 to 30 parts by weight per 100 parts by weight of the mixture of polyetherimide and polyamide.

5. A composition comprising:
a) a polyetherimide resin,
b) a polyamide resin, and
c) a phenolic additive selected from the group consisting of bis(4-hydroxyphenyl)methane, 2,2-bis(4-hydroxyphenyl)propane and resorcinol, the ratio of polyetherimide resin to polyamide resin being from 5 to 95% by weight of polyetherimide resin to from about 95 to 5% by weight polyamide resin, said phenolic additive being present in said composition in an amount of from 0.5 to 30 parts by weight per 100 parts by weight of the mixture of polyetherimide resin and polyamide resin.

6. A composition comprising:
a) a polyetherimide resin;
b) a polyamide resin; and
c) a diphenol.

* * * * *